US008534675B2

(12) United States Patent
Heinz-Schwarzmaier et al.

(10) Patent No.: US 8,534,675 B2
(45) Date of Patent: Sep. 17, 2013

(54) STRIP SEAL AND METHOD FOR DESIGNING A STRIP SEAL

(75) Inventors: Thomas Heinz-Schwarzmaier, Wettingen (CH); Ulrich Steiger, Baden-Daettwil (CH); Ulrich Rathmann, Baden (CH)

(73) Assignee: Alstom Technology Ltd, Baden (CH)

( * ) Notice: Subject to any disclaimer, the term of this patent is extended or adjusted under 35 U.S.C. 154(b) by 795 days.

(21) Appl. No.: 12/694,765

(22) Filed: Jan. 27, 2010

(65) Prior Publication Data

US 2010/0187762 A1 Jul. 29, 2010

(30) Foreign Application Priority Data

Jan. 28, 2009 (EP) .................................... 09151505

(51) Int. Cl.
*F16J 3/00* (2006.01)

(52) U.S. Cl.
USPC .......................................... 277/650; 277/654

(58) Field of Classification Search
USPC .......... 277/647, 650, 652–654; 415/134–139
See application file for complete search history.

(56) References Cited

U.S. PATENT DOCUMENTS 3,836,279 A 9/1974 Lee
4,902,198 A 2/1990 North
5,531,457 A 7/1996 Tibbott et al.
6,682,300 B2 * 1/2004 Bolms ........................ 415/173.3
6,712,581 B2 * 3/2004 Florjancic et al. ............ 415/135
7,887,286 B2 * 2/2011 Abgrall et al. ................ 415/119
2003/0057654 A1 * 3/2003 Florjancic et al. ............ 277/411
2005/0092566 A1 5/2005 Good et al.
2005/0179215 A1 8/2005 Kono
2006/0137351 A1 * 6/2006 Rathmann ....................... 60/752
2007/0104571 A1 5/2007 Drerup et al.
2008/0247867 A1 * 10/2008 Heinz-Schwarzmaier et al. .. 415/173.7
2009/0155054 A1 * 6/2009 Rathmann ..................... 415/134

FOREIGN PATENT DOCUMENTS

CH 698921 B1 * 12/2009
DE 10225264 A1 * 4/2003
EP 0 357 984 A1 3/1990
EP 1286021 A1 * 2/2003
EP 1 529 926 A2 5/2005
EP 1 566 521 A1 8/2005
EP 1 785 592 A2 5/2007
GB 2 280 935 A 2/1995

OTHER PUBLICATIONS

European Search Report dated Sep. 4, 2009.

* cited by examiner

*Primary Examiner* — Gilbert Lee
(74) *Attorney, Agent, or Firm* — Buchanan Ingersoll & Rooney PC

(57) ABSTRACT

A strip seal and method of configuration thereof for sealing two adjacent non-rotating gas turbine hot gas components exposed to pressure pulsations. The strip seal has at least two clamping projections distributed along discrete points of the strip seal length that extend out from a pressure face of the strip seal. The location of the projections are defined by two ratios. The first ratio, of less than 25, is the strip seal length extending free of clamping projections from any one of the ends of the strip seal to a clamping projection to the ratio of strip seal thickness. The second ratio, of less than 200, is the ratio of the strip seal length extending free of clamping projections between any two projections to the thickness of the strip seal. This seal arrangement ameliorates detrimental effects of induced resonance.

20 Claims, 4 Drawing Sheets

STRIP SEAL AND METHOD FOR DESIGNING A STRIP SEAL

RELATED APPLICATIONS

This application claims priority under 35 U.S.C. §119 to European Patent Application No. 09151505.6 filed in Europe on Jan. 28, 2009, the entire content of which is hereby incorporated by reference in its entirety.

FIELD

The present disclosure relates to metal strip seals that fit into grooved recesses formed in two components and to methods of designing strip seals.

Throughout this specification:

a strip seals refer to strip seals made of metal;

a strip seal pressure drop is the pressure drop across the strip seal during normal operation of the strip seal and excludes the influence of pressure pulsation; and a gas turbine hot gas component is a component that is as least in part exposed to hot combustion gases as they flow through a gas turbine.

BACKGROUND INFORMATION

Strip seals, which are also known as feather seals, can be used to eliminate leakage flow between two components arranged adjacently to one another. This is achieved by the two components having groove recesses in edge faces that lie substantially opposite and adjacent to one another. The strip seal seals the gap between the two components by being at least partially received into the groove recesses of the adjacently fitted components so as to span the gap between the components. U.S. Pat. No. 5,531,457 discloses an example of such a strip seal used to reduce leakage flow through the gap between two platforms of a blade.

The grooved recesses of fitted components often do not perfectly align due to, for example, manufacturing tolerances or as a result of thermal expansion. If the strip seal is manufactured so as to tightly fit into the groove recesses, a less than perfect groove recess alignment would result in high stress loading of the strip seal, which can result in premature failure.

In recognition of this drawback, strip seals can be made thinner than the height of the grooved recesses and flexible orthogonal to the strip seal length. In operation, the pressure differential across the seal, due to the flexibility of the strip seal, forces the strip seal against one surface of the grooved recess to effect a seal. When the pressure differential is low, strip seals are made thinner so as to increase their flexibility strip. To hold thin seals in place, for example during installation, the strip seal may be provided with biasing means which can be dispersed along the strip seal length. An example of biasing means is described in U.S. Pat. No. 3,836,279.

During operation, the strip seals can be exposed to periodic pressure pulsations caused by the passing of rotating blades as they pass the non-rotating regions within which the strip seals are contained. Depending on the strength and frequencies of the pressure pulsations, parts of the strip seal that are not biased against faces of the groove recess or otherwise retained can be induced into periodic resonance leading to premature fatigue failure of the strip seal. An application where this drawback is particularly relevant is in the sealing of components in gas turbines where rotating blades of the gas turbine induce pressure pulsation at sealing faces.

By reducing the seal length, it is possible to avoid fatigue failure. However, when strip seal length is shorter than the length of the recess groove, sealing is made more complicated. There is therefore a desire for a strip seal which is resilient to fatigue failure induced by pressure pulsation independent of strip seal length.

SUMMARY

An exemplary embodiment provides a strip seal for sealing two adjacent non-rotating gas turbine components. The components include complimentary grooved recesses configured and arranged to receive the strip seal so that the strip seal, when received into the grooved recesses, extends between the components to provide a seal between a higher pressure medium and a lower pressure medium acting on the components. The strip seal is constituted by a material having a dynamic modulus of at least one of approximately 232 GPa at a temperature of 20° C., approximately 217 GPa at a temperature of 200° C., approximately 201 GPa at a temperature of 400° C., approximately 184 GPa at a temperature of 600° C., approximately 176 at a temperature of 700° C., approximately 169 GPa at a temperature of 800° C., approximately 161 GPa at a temperature of 900° C., and approximately 153 GPa at a temperature of 1,000° C. The exemplary strip seal comprises a pressure face configured to be acted upon by the higher pressure medium, a sealing face configured to be acted upon by the lower pressure medium, a first end, a second end, a length extending between the first end and the second end, a width extending substantially normal to the length, at least two clamping projections distributed along discrete points of the length, where the at least two clamping projections extend from the pressure face and are configured to prevent localized movement of the strip seal when fitted, and a thickness defined as a distance free of projections between the pressure face and the sealing face. In addition, the strip seal has (i) a first ratio of the length of the strip seal extending free of clamping projections from any one of the ends to a clamping projection, to the thickness, of less than 25, and (ii) a second ratio of the length of the strip seal extending free of clamping projections between any two of projections, to the thickness, of less than 200.

An exemplary embodiment provides a method for configuring a strip seal for sealing two adjacent components with clamping projections to ensure resilience to induced resonance. The exemplary method includes the steps of: a) determining a resonance frequency to which the strip seal will be exposed during operation; b) clamping the strip seal at the clamping projections; c) applying the clamped strip seal to the frequency determined in step a); d) measuring the response of the clamped strip seal to the applied frequency; e) assessing acceptability of the response measured in step d); and f) if the response assessed in step e) is not acceptable, reconfiguring at least one of a location and number of the clamping projections, and repeating from step b).

Another exemplary embodiment provides a method for configuring a strip seal for sealing two adjacent components so that the strip seal ensures resilience to induced resonance, the method including the steps of: a) determining an operational excitation frequency of each component; and b) arranging one or more clamping projections on the strip seal as a function of the determination of step a) and properties of the strip seal.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Figure 1:
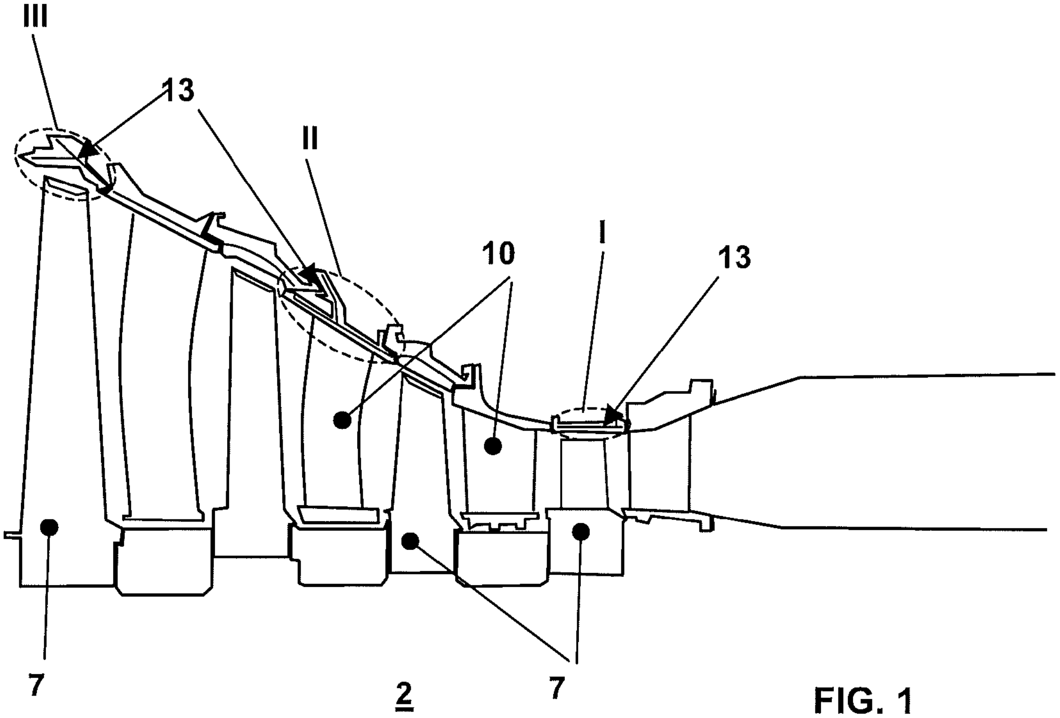
FIG. 1 is a schematic view of a portion of a gas turbine that has components with strip seals according to an exemplary embodiment of the present disclosure.

Exemplary embodiments of the present disclosure provide a metal gas turbine strip seal which is configured to be resilient to induced resonance independent of strip seal length. Exemplary embodiments of the present disclosure provide a metal strip seals that fit into grooved recesses formed in two components and methods of designing strip seals for use in the above-mentioned way to seal gas turbine components in the hot gas section of a gas turbine. According to an exemplary embodiment, the grooved recesses are formed to be substantially adjacent, when the components are fitted, in such a manner that enables a strip seal to be received into the grooved recesses and span between the components. Under the action of a force caused by differential pressure across the strip seal, the strip seal forms a substantially gastight seal.

An exemplary embodiment of the present disclosure is based on the concept of changing the natural frequency of the strip seal so that it is different from the pressure pulsation frequency of the gas turbine. This can be achieved, for example, by providing discrete points along the strip seal length, based on certain criteria, that prevent localized orthogonal movement of the strip seal so that the natural frequency of strip seal lengths between clamped regions are either out of phase with or overtones of the pressure pulsation frequency to which regions of the seal are exposed.

An exemplary embodiment provides a strip seal for sealing two adjacent non-rotating gas turbine hot gas components exposed to a pressure pulsation frequency of between about 3000-6000 Hz. The components include complimentary grooved recesses that are configured and arranged to receive the strip seal so that the strip seal, when received into the grooved recesses, extends between the components so as to provide a seal between a higher pressure medium and a lower pressure medium acting on the components. The strip seal can be made of a material having the same or similar dynamic modulus of elasticity shown in Table 1.

TABLE 1

| | Temperature (° C.) | | | | | | | |
|---|---|---|---|---|---|---|---|---|
| | 20 | 200 | 400 | 600 | 700 | 800 | 900 | 1000 |
| Dynamic Modulus of Elasticity (GPa) | 232 | 217 | 201 | 184 | 176 | 169 | 161 | 153 |

The exemplary strip seal can also include a pressure face onto which, in use, the higher pressure medium acts, a sealing face onto which, in use, the lower pressure medium acts, a first end, a second end, a length extending between the first end and the second end, a width extending normal to the length, at least two clamping projections distributed along discrete points of the length and extending out from the pressure face configured to prevent localized movement of the strip seal, and a thickness defined as the distance free of projections between the pressure face and the sealing face.

The strip seal can be characterized by two ratios. The first ratio, of less than 25, is the ratio of the strip seal length extending free of clamping projections from, any one of the ends of the strip seal to a clamping projection, to the strip seal thickness. It was found that this ratio equally applies to strip seals without projections and so is a limit currently faced by known strip seals. By providing that the strip seal conforms to a second ratio, of less than 200, that includes the ratio of, the strip seal length extending free of clamping projections between any two projections, to the strip seal thickness, the length of the seal is not limited by induced resonance concerns and so can be made suitable thin for operation at differential pressure conditions below 2 bar.

The second ratio value limit is based on the observation that a strip seal with a thickness of between 0.2 mm and 0.8 mm+/−0.1 mm, at points of the strip seal free of clamping projections, is resilient to induced resonance when the second ratio is kept either between 72 and 92 or between 150 and 170.

In a further exemplary embodiment, the clamp projections extend only part way across the width of the strip seal so by reducing leak potential around the clamped projections.

According to an exemplary embodiment, the clamping projections are configured to prevent localized movement of the strip seal in the traverse direction by being configured to extend from the pressure face so as to bias the sealing face against a wall of the grooved recess.

According to an exemplary embodiment, the strip seal has a first layer that forms the pressure face, and a second layer that forms the sealing face.

According to an exemplary embodiment, the clamping projections can include stamped projections having an indentation on the sealing face opposite projections on the pressure face, formed projections, and/or a combination of stamped projections and formed projections.

An exemplary embodiment of the present disclosure provides a method for configuring a strip seal, for sealing two adjacent components, with clamping projections to ensure resilience, in use, to induced resonance. The method can include the steps of: a) determining the frequency the strip seal will be exposed to during operation; b) clamping the strip seal at the clamping projections; c) subjecting the clamped strip seal to the frequency determined in step a); d) measuring the response of the clamped strip seal to the determined frequency; e) assessing the acceptability of the response of step d), if acceptable the method steps are complete otherwise proceed to step f); and f) reconfiguring the location and/or number of clamping projections then repeat from step b).

The exemplary method provides a means of modifying an existing strip seal in a way that does not require reconfiguration of gas turbine components in order to reuse the strip seals.

Another exemplary embodiment of the present disclosure provides a method for configuring a strip seal to ensure resilience, in use, to induced resonance. The exemplary method can include the steps of: determining the operational excitation frequency of each component; and arranging one or more clamping projections on the strip seal as a function of the determination of step a) and properties of the strip seal.

The properties may include at least one of length, thickness and a material property of the strip seal.

In another exemplary embodiment, in accordance with either of these two methods, the determination of step a) is by calculation or by measurement.

Other objectives and advantages of the present disclosure will become apparent from the following description, taken in connection with the accompanying drawings wherein by way of illustration and example, embodiments of the disclosure are disclosed.

Exemplary embodiments of the present disclosure are now described with reference to the drawings, wherein like reference numerals are used to refer to like elements throughout. In the following description, for purposes of explanation, numerous specific details are set forth in order to provide a thorough understanding of the disclosure. It may be evident, however, that the disclosure may be practiced without these specific details.

FIG. 1 shows a portion of a gas turbine 2 with multiple blades 7 and vanes 10 each of which comprise components 13 which need to be sealed against each other to prevent the loss of a high pressure medium contained in plenums from the lower pressure hot gas of the gas turbine. In order to achieve such sealing according to an exemplary embodiment, strips seals 20 (shown in FIGS. 2-4, for example) seal circumferentially distributed non-rotating components 13. The passing of rotating blades 7 past non-rotating components 13 subjects the components 13 to pressure pulsation. Consequently, seals of these components are exposed to cyclical pressure pulsation. Where the pressure differential across the strip seals 20 (shown in FIGS. 2-4, for example) is low, for example below 2 bar, seals are made thin, the resulting flexibility of the strip seals 20 (shown in FIGS. 2-4, for example) make then susceptible to failure due to induced resonance.

Regions I, II and III, shown in FIG. 1 are exemplary regions of a gas turbine 2 that include components 13 which may be exposed to pressure pulsation and are subject to low pressure differential. Therefore, these regions are regions were embodiments of the present disclosure may be suitably applied.

Region I shown in FIG. 1 is a heat shield of the first blade 7 of the gas turbine 2, which in an exemplary gas turbine 2 has a seal pressure differential of less than about 2 bar and as a result has a seal strip thickness of about 0.5 mm. As the blade 7 in this region is unshrouded according to an exemplary embodiment, the component 13 passed over by the tip of the rotating blade 7 is subject to particularly severe pressure pulsation.

Region II, shown in FIG. 1, is a platform of a vane 10 which in an exemplary gas turbine 2 has a seal pressure drop of less than about 0.5 bar and thus can involve very thin strip seals 20. Therefore, despite not being exposed to the same degree of pressure pulsation as Region I, seals in this region II may still be prone to premature fatigue failure caused by pressure pulsation due to their thin and therefore flexible nature.

Region III, shown in FIG. 1, is a heat shield component 13 near the outlet of the exemplary gas turbine 2. Although the region III is opposite a shrouded blade 7 according to an exemplary embodiment, the seal pressure drop is as that in region II and so it can also be prone to premature fatigue failure caused by pressure pulsation for similar reasons.

Figure 2:
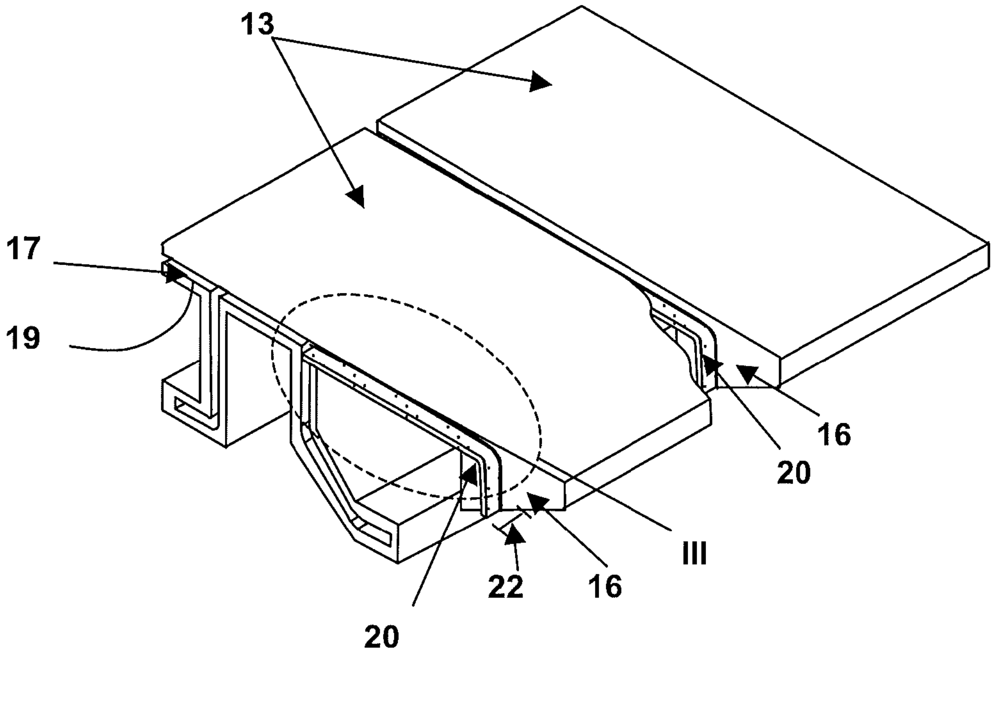
FIG. 2 is an expanded view of portions of FIG. 1 showing two adjacently fitted components with strip seals according to an exemplary embodiment of the present disclosure.

FIG. 2 is an expanded schematic view of a generic component 13 having features relating to strip seals 20 common to the components 13 in regions I, II and III shown in FIG. 1. The components 13, in use, are adjacent to non-rotating gas turbine hot gas components 13 circumferentially fitted in a gas turbine 2. Two adjoining components 13 are shown in the exemplary configuration illustrated in FIG. 2. A strip seal 20 extending between the components 13 provides a means of sealing the components 13. To accommodate the strip seals 20, each of the components 13 has an edge face 16 which defines the joining face between adjoining components 13. Each edge face 16 of each component 13 has a grooved recess 17 complimentary to the grooved recess 17 of adjacently fitted components 13. The grooved recess 17 is alignable so as to enable the receiving of a strip seal 20 in the grooved recesses 17 of each adjacent component 13 at the same time so that the received strip seal 20 extends between the adjacent components 13. In this way, the strip seal 20 provides a seal between the higher pressure medium and the lower pressure medium on either side of the component 13. The ability of the grooved recesses 17 to receive a strip seal 20 is further enabled by the width 22 of the strip seal 20 relative to the depth of each of the grooved recesses 17.

Figure 3:
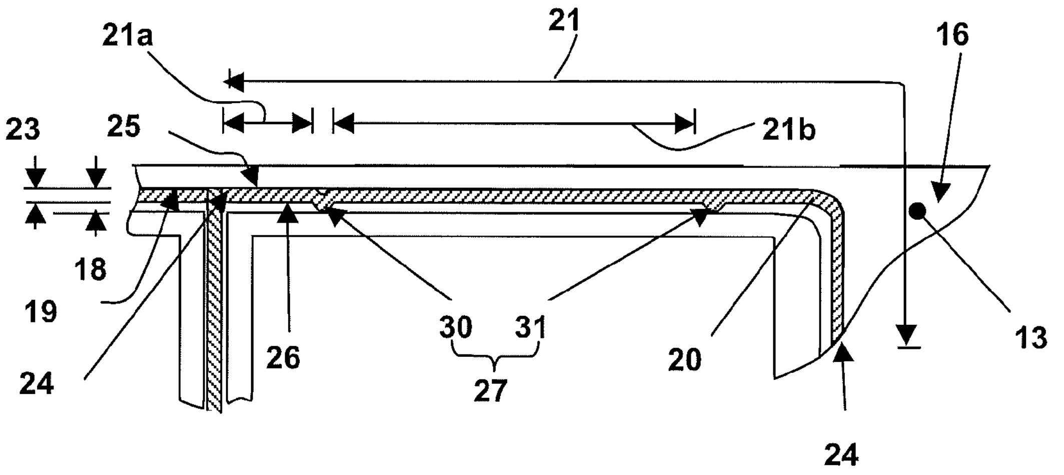
FIG. 3 is an expanded side view of a component of FIG. 2 showing a strip seal according to an exemplary embodiment of the present disclosure.

FIG. 3 is an expanded side view of the components 13 of FIG. 2 showing a received strip seal 20. The strip seal 20 has a length 21, extending between the distal ends 24 of the strip seal 20, that enables the strip seal 20 to provide a seal along a length of the grooved recess 17. According to an exemplary embodiment, the strip seal 20 provides a seal between higher and lower pressure mediums acting on the strip seal 20. The higher pressure medium, acting on a pressure face 26 of the strip seal 20, presses the sealing face 25 of the strip seal 20 onto a sealing surface 19 of the grooved recess 17. According to the exemplary embodiment illustrated in FIG. 3, the sealing face 25 is the surface substantially parallel to but on the opposite side than the pressure face 26 of the strip seal 20. In this way, the pressure difference across the strip seal 20 enables the strip seal 20 to seal.

The thickness 23 of the strip seal 20, defined as the dimension between the pressure face 26 and the sealing face 25 of the strip seal 20 free of protrusions or projections 27, is less than the groove height 18 so that the inserted strip seal 20 is not stressed by any misalignment of adjacently fitted components 13.

To ensure that the strip seal 20 is held firmly in the grooved recess 17, despite the thickness 23 being less than the groove height 18, the pressure face 26 of the strip seal 20 is provided with discrete clamping projections 27 along its length 21 that bias the sealing face 25 against the sealing surface 19 of the grooved recess 17. In this way, the strip seal 20 is held firmly at discrete points in the grooved recess 17 so as to prevent localized movement independent of the pressure difference across the strip seal 20 or pressure pulsations to which the strip seal 20 may be exposed.

Figure 4:
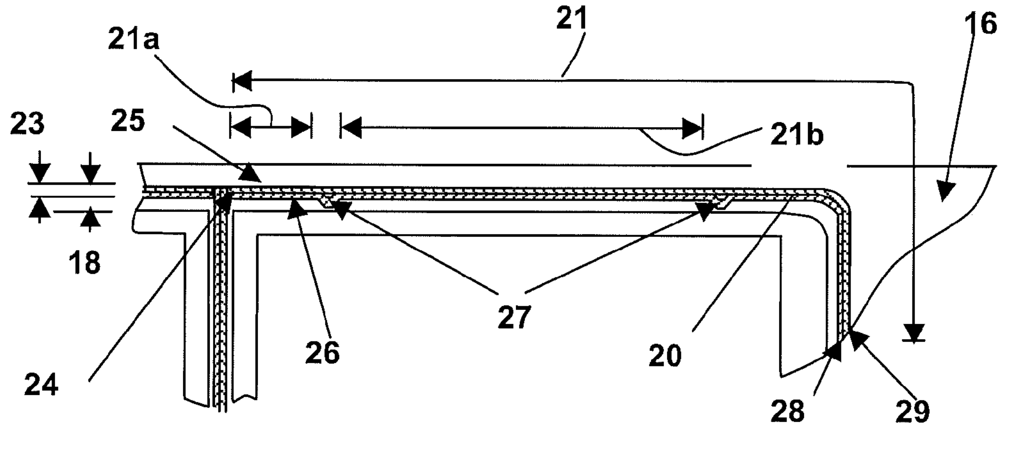
FIG. 4 is an expanded side view of the component of FIG. 2 showing another strip seal according to an exemplary embodiment of the present disclosure.

FIG. 3 further shows exemplary embodiments with clamping projections 27 including formed projections 31 which may be formed by being bonded onto or machining projections 27 on to the pressure face 26 of the strip seal 20, and stamped projections 30 which may be formed by stamping the sealing face 25 of the strip seal 20 to result in an indentation on the sealing face 25 that corresponds to the stamped projection 30 on the pressure face 26. To eliminate the potential leak path created by stamping at the sealing face 25, the strip seal 20, in another exemplary embodiment, can be configured to comprise a second layer 29, as shown in FIG. 4, that forms the sealing face 25 of the strip seal 20. This second layer 29, which is bonded to a first layer 28, forms the pressure face 26, and does not have any indentions, thereby ensuring a continuous sealing face 25 absent of any leakage path.

In another exemplary embodiment, the clamping projections 30 can extend only part way across the width 22 (shown in FIG. 2) of the strip seal 20 to eliminate seal leakage at the projections.

The frequency at which a strip seal 20, shown generally in the drawings, will be induced to resonant pressure is influenced by the length 21, thickness 23 and material properties of the strip seal 20. The material property of particular importance is the dynamic modulus of elasticity at the operating temperature. It has generally be found that a strip seal 20 of a gas turbine 2 component 13 made of material with a dynamic modulus of elasticity which is the same or similar to Table 1 above can be made resilient to induced resonance if the strip seal 20 is made to conform to general length to thickness ratios.

An exemplary embodiment provides a strip seal 20 for a gas turbine 2. The strip seal 20 is resilient to induced resonance when exposed to a pressure pulsation frequency of between about 3000-6000 Hz. The strip seal 20 has a first ratio of the length 21*a* of the strip seal 20 extending free of clamping projections 27 from any one of the ends 24 of the strip seal 20 to a clamping projection 27, to the thickness 23, of less than twenty five, and a second ratio of the length 21*b* of the strip seal 20 extending free of clamping projections 27 between any two clamping projections 27, to the thickness 23, of less than 200.

Very thin seals lack durability and potentially do not have sufficient rigidity for projections 27 to provide an adequate localised claiming function. For gas turbine service, therefore, strip seals can be at least 0.4 mm thick although they can be as thin as 0.2 mm thick. An exemplary embodiment provides a strip seal 20 with a thickness 23 of between 0.2 mm to 0.8 mm, within a tolerance of approximately +/−0.1 mm. Another exemplary embodiment provides a strip seal 20 with a thickness of between 0.3 mm to 0.5 mm, within a tolerance of approximately +/−0.1 mm. A thicker seal is more ridged, and so the advantages that the projections 27 impart is reduced. Therefore projections in another exemplary embodiment are applied to seals thicker than 0.8 mm, within a tolerance of approximately +/−0.1 mm, however with reducing benefit.

In a more specific example of this exemplary embodiment, the strip seal 20 has any of these stated preferred thicknesses 23 at points of the strip seal 20 free of clamping projections 27 and a second ratio of between 72 and 92.

A yet further specific example of this exemplary embodiment provides a strip seal 20 with any of the stated preferred thicknesses 23 at points of the strip seal 20 free of clamping projections 27 and a second ratio between 150 and 170.

Figure 5:
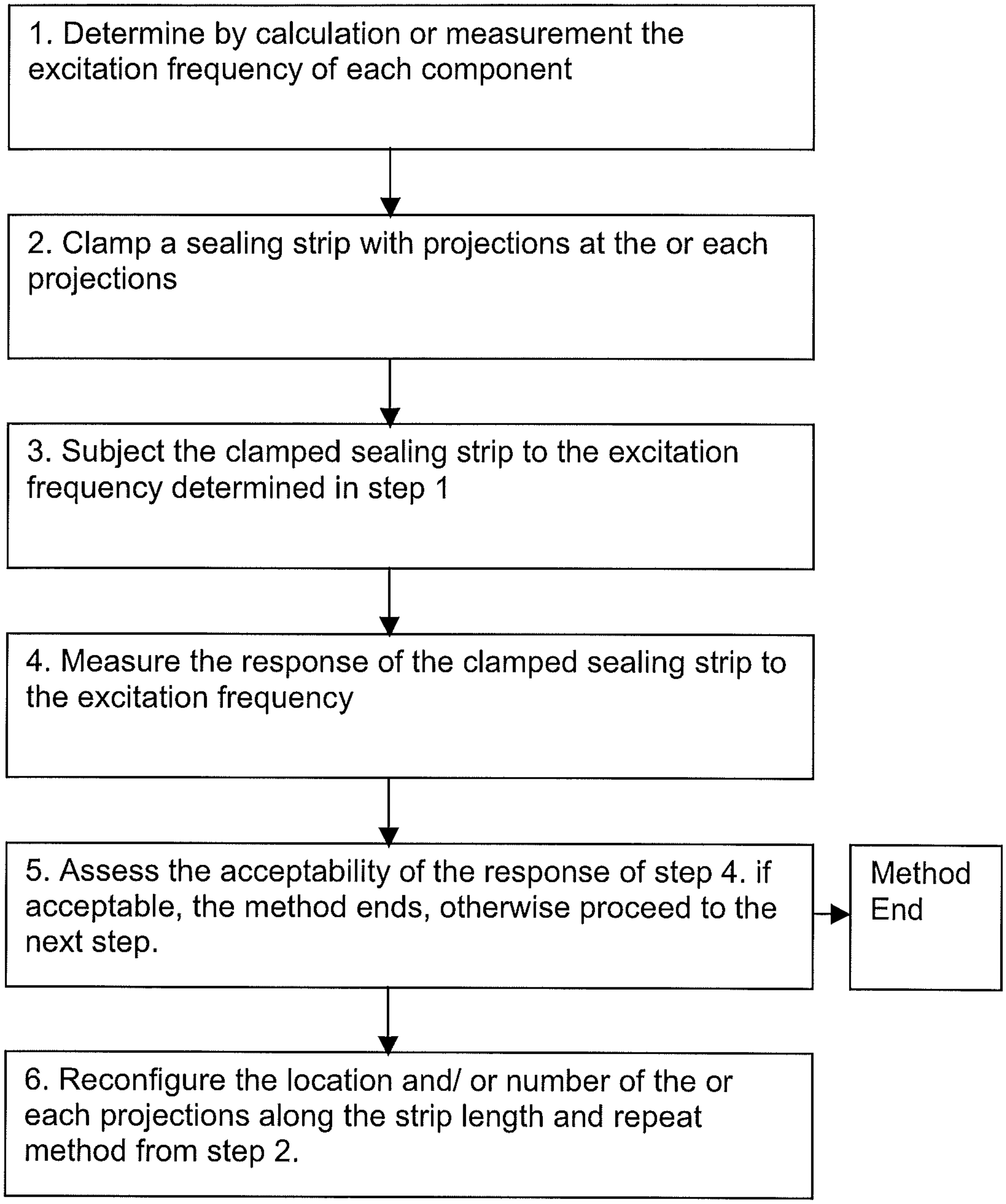
FIG. 5 is a flow chart of a method of configuring a strip seal according to an exemplary embodiment of the present disclosure.

As shown in FIG. 5, another exemplary embodiment provides a method for arranging clamping projections 27 on a strip seal 20 so as to ensure the induced resonance resilience of the strip seal 20. In a first step the operational pressure frequency caused by rotating blades 7 is calculated or measured using known calculation methods and techniques. The calculation can be based on rotor frequency, typically 50 Hz or 60 Hz, and the number of blades, which can be about 100 per row. Multiplying the two values together can yield an estimated periodic frequency of between 3000 and 6000 Hz, for example.

The next step involves clamping a strip seal 20 with clamping projections 27 at the clamping projections 27. The strip seal 20 is then subjected to the frequency estimated in the first step. Its excitation response is then measured by means of an accelerometer or the like. The measurement of the excitation response is then used to assess the acceptability of the response assessed by the degree of induced resonance in the strip seal 20. If the strip seal 20 is not excited by the induced frequency, the performance of the strip seal 20 is considered acceptable and the method is complete. Otherwise, further method steps are performed.

If the method is not completed following step 5, the next step is to reconfigure the strip seal 20 so as to ensure acceptable performance of the strip seal 20. This can be achieved by forming additional clamping projections 27 along the length 21 in the regions of the strip seal 20 in locations based on the findings of the previous step.

In another exemplary embodiment, reconfiguration can be achieved by reducing the number of clamping projections 27 by manufacturing a new strip seal 20 or else removing existing clamping projections 27. Subsequently new clamping projections 27 may be formed in different locations. The end result may be a strip seal 20 with more, the same or less clamping projections 27.

As the skilled person would appreciate, the preferred reconfiguration for a given application is dependent on many factors, not limited to seal resonance performance, wherein different circumstances can be optimally served by different strip seal 20 reconfiguration methods, and the various exemplary embodiments described herein can provide useful alternatives.

Figure 6:
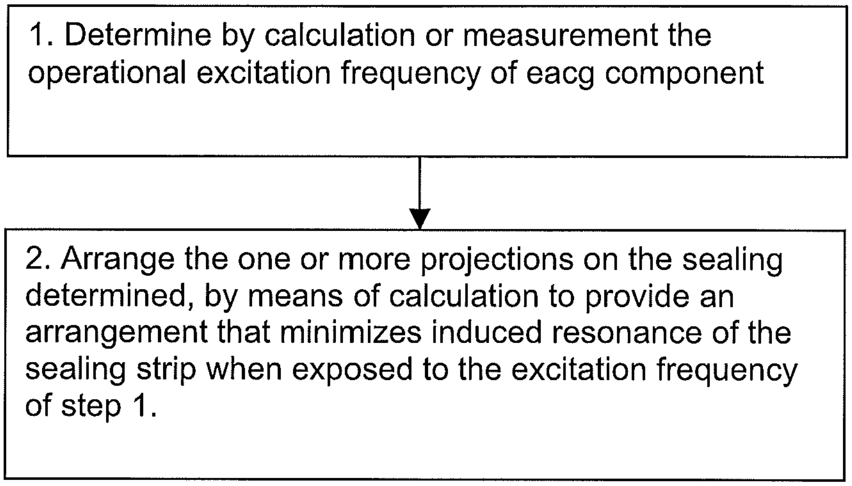
FIG. 6 is a flow chart of a method of configuring a strip seal according to another exemplary embodiment of the present disclosure.

Another exemplary method provides a method that can be used in conjunction with strip seal 20 manufacture that ensures the strip seal 20 is resilient to induced resonance during exposure to operational pressure pulsing. The exemplary method comprises the steps shown in FIG. 6. First, the operational excitation frequency of each blade 7 is calculated or measured by known techniques. Next, using known properties of the strip seal 20, one or more clamping projections 27 are arranged on the strip seal 20 in an arrangement, which can be confirmed by calculation, that minimizes induced resonance of the strip seal 20 when exposed to the estimated excitation frequency of the first step.

In a further exemplary embodiment, the known properties of the strip seal 20 used in the calculation can include, for example, the length 21, the thickness 23, the width 22, and a material property of the strip seal 20 such as the dynamic modulus of elasticity.

While exemplary embodiments have been described with reference to gas turbines 2, embodiments of the disclosure can be used in other applications where there is potential for premature failure due to induced resonance.

Further, although the present disclosure has been herein shown and described in what is conceived to be exemplary embodiments, it will be recognized by those skilled in the art that departures can be made within the scope of the disclosure, which is not to be limited to details described herein but is to be accorded the full scope of the appended claims so as to embrace any and all equivalent devices and apparatus.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

| Reference Numbers | |
|---|---|
| 2 | gas turbine |
| 7 | blade |
| 10 | vane |
| 13 | component |
| 16 | edge face |

-continued

| Reference Numbers | |
|---|---|
| 17 | grooved recess |
| 18 | groove height |
| 19 | sealing surface |
| 20 | strip seal |
| 21 | length |
| 21a | length from end to a projection |
| 21b | length from a projection to a projection |
| 22 | width |
| 23 | thickness |
| 25 | sealing face |
| 24 | end |
| 26 | pressure face |
| 27 | clamping projections |
| 28 | first layer |
| 29 | second layer |
| 30 | stamped projections |
| 31 | formed projections |
| I, II, III | gas turbine regions |

What is claimed is:

1. A strip seal for sealing two adjacent non-rotating components of a gas turbine, the components comprising complimentary grooved recesses configured and arranged to receive the strip seal so that the strip seal, when received into the grooved recesses, extends between the components to provide a seal between a higher pressure medium and a lower pressure medium acting on the components, wherein the strip seal is constituted by a material having a dynamic modulus of at least one of approximately 232 GPa at a temperature of 20° C., approximately 217 GPa at a temperature of 200° C., approximately 201 GPa at a temperature of 400° C., approximately 184 GPa at a temperature of 600° C., approximately 176 at a temperature of 700° C., approximately 169 GPa at a temperature of 800° C., approximately 161 GPa at a temperature of 900° C., and approximately 153 GPa at a temperature of 1,000° C.;

wherein the strip seal comprises:

a pressure face configured to be acted upon by the higher pressure medium;

a sealing face configured to be acted upon by the lower pressure medium;

a first end;

a second end;

a length extending between the first end and the second end;

a width extending substantially normal to the length;

at least two clamping projections distributed along discrete points of the length, the at least two clamping projections extending from the pressure face and configured to prevent localized movement of the strip seal when fitted; and a thickness defined as a distance free of projections between the pressure face and the sealing face; and wherein the strip seal has:

a first ratio of the length of the strip seal extending free of clamping projections from any one of the ends to a clamping projection, to the thickness, of less than 25;

a second ratio of the length of the strip seal extending free of clamping projections between any two of projections, to the thickness, of less than 200; and a natural frequency that is changed to be different from a pulsation frequency of the gas turbine.

2. The strip seal of claim 1, wherein the second ratio is between 72 and 92.

3. The strip seal of claim 1, wherein the second ratio is between 150 and 170.

4. The strip seal of claim 1, wherein the strip seal has a thickness of between 0.1 mm and 0.9 mm at points of the strip seal free of clamping projections.

5. The strip seal of claim 1, wherein the clamping projections extends only part way across the width.

6. The strip seal of claim 5, wherein the clamping projections are configured to prevent the localized movement by being configured to extend from the pressure face so as to bias the sealing face against a wall of the grooved recess.

7. The strip seal of claim 1, wherein the clamping projections are configured to prevent the localized movement by being configured to extend from the pressure face so as to bias the sealing face against a wall of the grooved recess.

8. The strip seal of claim 7, wherein the strip seal has a first layer that constitutes the pressure face and a second layer that constitutes the sealing face.

9. The strip seal of claim 7, wherein the clamping projections comprise at least one of:

stamped projections having an indentation on the sealing face opposite projections on the pressure face;

formed projections; and a combination of stamped projections and formed projections.

10. The strip seal of claim 1, wherein the strip seal has a first layer that constitutes the pressure face and a second layer that constitutes the sealing face.

11. The strip seal of claim 1, wherein the clamping projections comprise at least one of:

stamped projections having an indentation on the sealing face opposite projections on the pressure face;

formed projections; and a combination of stamped projections and formed projections.

12. The strip seal of claim 1, wherein the components are hot gas components configured to be exposed to a pressure pulsation frequency of between about 3000-6000 Hz.

13. A method for configuring the strip seal of claim 1 for sealing two adjacent components with clamping projections to ensure resilience to induced resonance, the method including the steps of:

a) determining a resonance frequency to which the strip seal will be exposed during operation;

b) clamping the strip seal at the clamping projections;

c) applying the clamped strip seal to the frequency determined in step a);

d) measuring the response of the clamped strip seal to the applied frequency;

e) assessing acceptability of the response measured in step d); and f) if the response assessed in step e) is not acceptable, reconfiguring at least one of a location and number of the clamping projections, and repeating from step b), to change a natural frequency of the strip seal to be different from the resonance frequency to which the strip seal will be exposed during operation.

14. The method of claim 13, wherein the determination of step a) is performed by at least one of calculation and measurement.

15. The method of claim 13, wherein the components are gas turbine hot gas components.

16. The method of claim 13, wherein the strip seal has a thickness of between 0.1 mm and 0.9 mm at points of the strip seal free of clamping projections.

17. A method for configuring the strip seal of claim 1 for sealing two adjacent components so that the strip seal ensures resilience to induced resonance, the method including the steps of:

a) determining an operational excitation frequency of each component; and b) arranging one or more clamping projections on the strip seal as a function of the determination of step a) and properties of the strip seal to change a natural frequency of the strip seal to be different from the determined operational excitation frequency of each component to which the strip seal is to be applied.

18. The method of claim 17, wherein the properties of the strip seal of step b) include at least one of length, thickness and a material property of the strip seal.

19. The method of claim 17, wherein the determination of step a) is performed by at least one of calculation and measurement.

20. The method of claim 17, wherein the components are gas turbine hot gas components.

* * * * *